United States Patent [19]
Muto

[11] Patent Number: 5,876,807
[45] Date of Patent: Mar. 2, 1999

[54] MAGNETO-OPTICAL RECORDING MEDIUM PRODUCTION METHOD

[75] Inventor: Yoshihiro Muto, Miyagi, Japan

[73] Assignee: Sony Corporation, Tokyo, Japan

[21] Appl. No.: 961,140

[22] Filed: Oct. 30, 1997

[30] Foreign Application Priority Data

Oct. 31, 1996 [JP] Japan ..................... 8-290560

[51] Int. Cl.$^6$ ..................... H01F 1/00
[52] U.S. Cl. ............. 427/548; 427/131; 427/132; 427/599
[58] Field of Search .................. 427/131, 132, 427/599, 548

*Primary Examiner*—Bernard Pianalto
*Attorney, Agent, or Firm*—Hill & Simpson

[57] ABSTRACT

The present invention provides a method for producing a magneto-optical recording medium capable of optical intensity modulation direct overwriting, which method enables to easily form an initialization layer having an excellent stability against the magnetization inversion during the optical intensity modulation direct overwriting.

When producing a magneto-optical recording medium at least a memory layer 1 which is magnetized according to a recording signal, a recording layer 2 whose magnetization direction is temporarily changed according to a recording signal during a recording, a switch layer 3 which is temporarily demagnetized during a recording, and an initialization layer 4 whose magnetization direction is not changed during a recording; the memory layer 1 is formed by forming at least a first magnetic layer 1a having a residual magnetization Mr smaller than a saturation magnetization Ms and a second magnetic layer 1b having a ratio Mr/Ms between the residual magnetization Mr and the saturation magnetization Ms greater than that of the first magnetic layer. Moreover, when forming the second magnetic layer 1b, an external magnetic field is applied almost in the vertical direction to the film surface.

2 Claims, 12 Drawing Sheets

INITIAL STATE

0

1

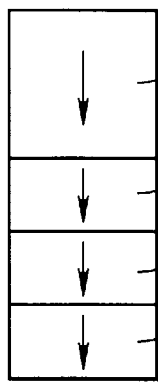 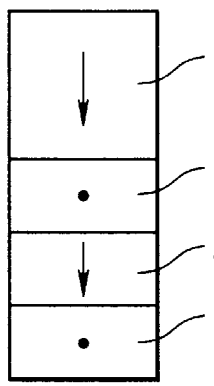 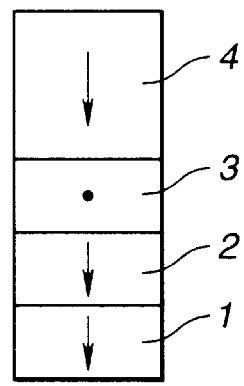 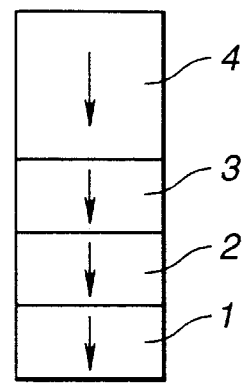
FIG.3A     FIG.3B     FIG.3C     FIG.3D
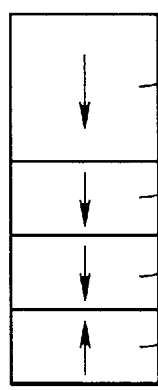 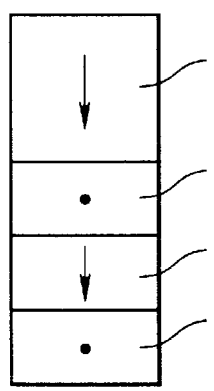 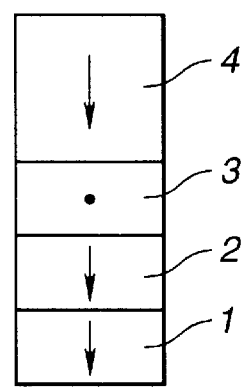 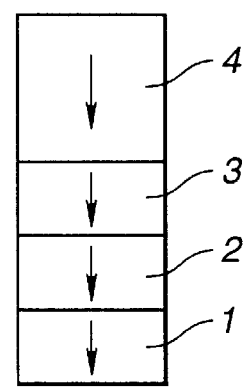
FIG.4A     FIG.4B     FIG.4C     FIG.4D

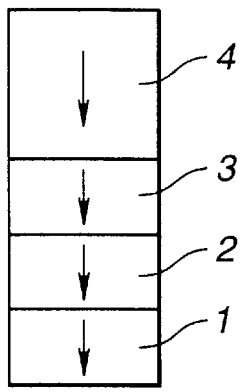 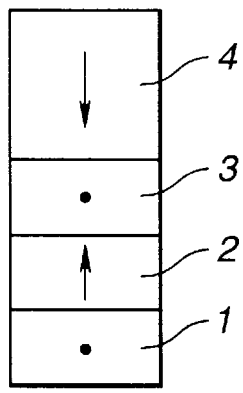 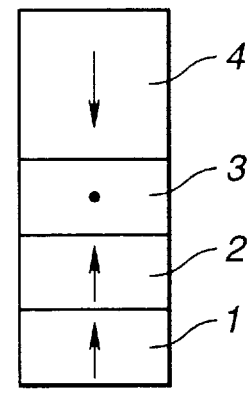 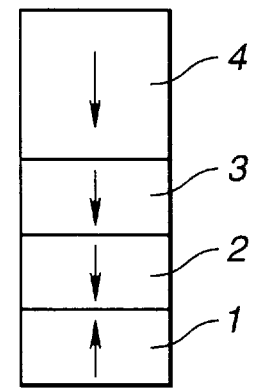
FIG.5A  FIG.5B  FIG.5C  FIG.5D
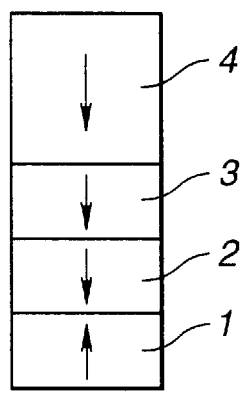 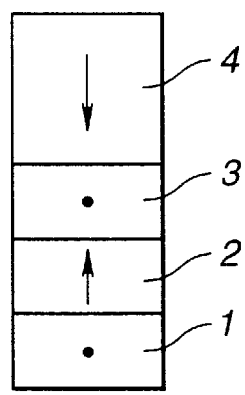 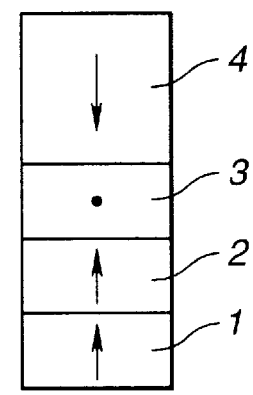 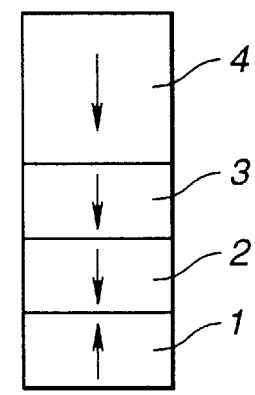
FIG.6A  FIG.6B  FIG.6C  FIG.6D

MAGNETO-OPTICAL RECORDING MEDIUM PRODUCTION METHOD

BACKGROUND OF THE INVENTION

1. Field of the Invention

The present invention relates to a method for producing a magneto-optical recording medium capable of recording a recording signal by the optical intensity modulation direct overwriting.

2. Description of the Prior Art

In the field of magneto-optical recording and reproduction, a request for a higher transfer rate has been raised. In order to answer this request, various techniques have been developed and are being implemented in practice. Among them, there can be named a technique of light-intensity modulation direct overwriting.

When recording data on an magneto-optical recording medium with a light-intensity modulation method, normally, a weak DC magnetic field is applied to the magneto-optical recording medium and a laser beam is radiated while modulating the beam depending on the presence/absence of a signal. Consequently, when re-recording a data on a already recorded area by using a conventional magneto-optical recording/reproduction apparatus of the light-intensity modulation method, it is necessary to erase the recorded area prior to the re-recording. That is, it is impossible to directly overwrite on the already recorded area.

Thus, most of the magneto-optical recording/reproduction apparatuses which have been implemented in practice require an erase operation prior to recording a new data. This means that the magneto-optical recording medium should rotate by at least two turns for recording a signal, which has prevented to provide a high transfer rate.

In order to solve such a problem, there has been designed the light-intensity modulation direct overwriting technique which employs the light-intensity modulation method and enables direct overwriting.

For example, Japanese Patent Laid-Open Sho 62-175948 discloses a light-intensity modulation direct overwriting method which employs an magneto-optical recording medium made from two magnetic layers layered having different magnetic characteristics and layered so as to be connected to each other by exchange interaction; and an magneto-optical recording and reproduction apparatus including: an optical system capable of radiating a beam controlled to two values, i.e., a high level and a low level, during a recording; a recording magnetic field generating apparatus which is used in an ordinary magneto-optical recording and reproducing apparatus; and a so-called initialization magnet, i.e., an external magnetic field generating apparatus capable of inverting only one of the two layers at a room temperature.

However, in order to realize a light-intensity modulation direct overwriting by using this technique, the initialization magnet should an initialization magnetic field in the order of several kOe, which is a problem in designing the magneto-optical recording and reproduction apparatus.

In order to cope with this, reduction of the initialization magnetic field has been tried such as in a method disclosed in Japanese Patent Laid-Open Hei 1-185853. Such efforts have reduced the initialization magnetic field in the order of 2 kOe, which is still a significantly great value if compared to the recording magnetic field in the order of 300 Oe. This initialization magnetic field is still a problem and this method is not yet implemented in practical use.

On the other hand, separately from the examination for reduction of the initialization magnetic field, a research has been made to enable the light-intensity modulation direct overwriting without using any initialization magnetic field. As a result, there has been designed an magneto-optical recording medium disclosed in Japanese Patent Sho 63-268103 and further in Japanese Patent Hei 3-219449.

This magneto-optical recording medium basically consists of the magneto-optical recording medium disclosed in Japanese Patent Laid-Open Sho 62-175948 with addition of a magnetic layer which serves as an initialization magnet by the exchange interaction force. This magnetic layer is prepared in such a manner that its magnetization will not change during a recording and is called an initialization layer. As can be understood from its role, the initialization layer is once magnetized in a predetermined direction after preparation of the medium, and after that its magnetization direction should not be inverted.

Consequently, in order to satisfy the condition that the initialization layer does not invert its magnetization direction during a direct overwriting, the initialization layer should have magnetic characteristics that the Curie temperature is sufficiently high and the product of the coercive force Hc and the saturation magnetization Ms is sufficiently great. As a material satisfying such magnetic characteristics, there can be exemplified TbFeCo (Co content is 50 atomic % or above) or the like. Examination has been made on a magneto-optical recording medium using such a material as the initialization layer.

The aforementioned initialization layer should be once magnetized in a predetermined direction after preparation of the medium, and it should satisfy the requirement that it can be polarized at a room temperature. For this, the initialization layer should have a coercive force Hc of ten and several kOe at a room temperature.

The TbFeCo which has been examined as the material of the initialization layer satisfies the conditions that the Curie temperature is sufficiently high and the product of the coercive force Hc and the saturation magnetization Ms is sufficiently great. However, there arise various problems when these magnetic characteristics are to be obtained simultaneously with satisfying the requirement that the coercive force Hc is ten and several kOe or below at the room temperature.

An amorphous of a rare earth element and a transition metal element such as TbFeCo shows at the compensation composition the infinite coercive force Hc, and the coercive force Hc is reduced when changing the composition ratio of the rare earth element and the transition metal element. In general, the composition containing an increased ratio of the rare earth element compared to the compensation composition is called RE-rich, whereas the composition containing an increased ratio of the transition metal element is called TM-rich. In other words, the coercive force Hc is reduced when the compensation composition is changed into any of the directions, i.e., into the RE-rich direction or into the TM-rich direction. Consequently, the composition satisfying the requirement that the coercive force Hc is ten and several kOe or below at the room temperature exists both in the RE-rich side and in the TM-rich side.

On the other hand, in the amorphous of rare earth and transition metal containing a plenty of Co such as TbFeCo containing 50 atomic % of Co or above, the Curie temperature greatly depends on the ratio between the rare earth element and the transition metal element, i.e., the Curie temperature is increased as the ratio of transition metal element is increased. If this situation is considered, in order to simultaneously satisfy the conditions that the Curie temperature is sufficiently high and the coercive force Hc is ten and several kOe at the room temperature, it is considered to select a composition of TM-rich having a coercive force Hc of ten and several kOe at the room temperature.

However, as this material shows the Curie temperature which is very high, in the composition of TM-rich satisfying the condition that the coercive force Hc is ten and several kOe at the room temperature, the magnetic anisotropy is lowered at a higher rate compared to the magnetization increase as the temperature increases, i.e., the magnetization direction is put into disorder below the Curie temperature. For this, conventionally, when using the amorphous of rare earth and transient metal such as TbFeCo as the initialization layer, there has been no other selection than to use a composition of RE-rich having a coercive force Hc of ten and several kOe at the room temperature.

Note that the Curie temperature is generally increased when the Co content is increased, and it is also considered to compensate the Curie temperature which has been lowered, with addition of Co. However, addition of Co which exhibits a great effect in the TM-rich composition exhibits only a small effect in the RE-rich composition. For this, addition of Co cannot sufficiently increase the Curie temperature of the initialization layer.

As has thus far been described, in the magnet-optical recording medium capable of light intensity modulation direct overwriting by providing the initialization layer, the initialization layer should simultaneously satisfy the conditions that the Curie temperature is sufficiently high, the product of the coercive force Hc and the saturation magnetization Ms is sufficiently great, and the coercive force Hc at the room temperature is ten and several kOe or below. However, it has been difficult to satisfy these conditions and to obtain an initialization layer having a high stability against the magnetization inversion during the light intensity modulation direct overwriting.

It is therefore an object of the present invention to provide a method for producing a magneto-optical recording medium capable of light intensity modulation direct overwriting, the method enabling to easily form an initialization layer having an excellent stability against the magnetization inversion during the light intensity modulation direct overwriting.

In order to achieve the aforementioned object, the present invention provides a method for producing a magneto-optical recording medium comprising: at least a magnetic layer which is magnetized according to a recording signal; a magnetic layer whose magnetization direction is temporarily changed according to a recording signal during a recording; a magnetic layer which is temporarily demagnetized during a recording; and a magnetic layer whose magnetization direction is not changed during a recording; wherein the magnetic layer which is magnetized according to a recording signal consists of at least a first magnetic layer in which residual magnetization Mr is smaller than saturation magnetization Ms, and a second magnetic layer in which a ratio Mr/Ms between a residual magnetization Mr and a saturation magnetization Ms is greater than that of the first magnetic layer; and an external magnetic field is applied in an almost vertical direction to a film surface at least when preparing the second magnetic layer on the first magnetic layer. Here, the aforementioned external magnetic field is preferably applied when the second magnetic layer has reached 0.5 nm thickness or above.

As has been described above, according to the present invention, an external magnetic field is applied in a vertical direction to a film surface when forming the second magnetic layer on the first magnetic layer. Thus, the magnetic layers are polarized. The magnetic layers which are formed afterwards are successively connected by exchange interaction and accordingly, the magnetization direction in each of the magnetic layers is not in disorder but oriented in a particular direction. Consequently, according to the present invention, the magnetic layer whose magnetization direction is not changed during a recording, i.e., the initialization layer is polarized in a particular direction regardless of its composition.

BRIEF DESCRIPTION OF THE DRAWINGS

FIGS. 3A, 3B, 3C and 3D schematically shows a magnetization transition when "0" is overwritten on "0" recorded.

FIGS. 4A, 4B, 4C and 4D schematically shows a magnetization transition when "0" is overwritten on "1" recorded.

FIGS. 5A, 5B, 5C and 5D schematically shows a magnetization transition when "1" is overwritten on "0" recorded.

FIGS. 6A, 6B, 6C and 6D schematically shows a magnetization transition when "1" is overwritten on "1" recorded.

DETAILED DESCRIPTION OF PREFERRED EMBODIMENTS

Description will now be directed to embodiments of the present invention with reference to the attached drawings. It should be noted that the present invention is not limited to the following embodiments but can be modified in various ways including the materials used within the scope of the present invention.

Firstly, explanation will given on a basic configuration of a magneto-optical recording medium produced according to an embodiment of the present invention.

Figure 1:
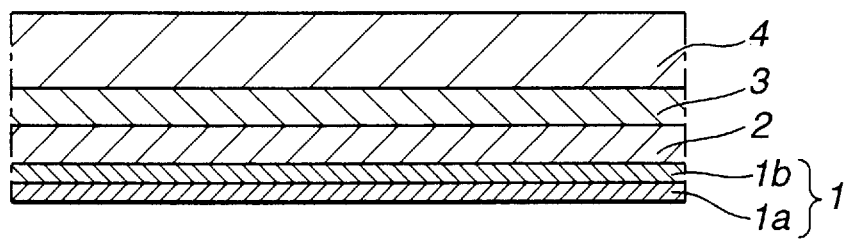
FIG. 1 is a cross-sectional view showing an example of magnetic layers formed on a magneto-optical disk according to the present invention.

This magneto-optical recording medium is a magneto-optical disk capable of light intensity modulation direct overwriting and, as shown in FIG. 1, includes a memory layer 1, a recording layer 2 formed on the memory layer 1, a switch layer 3 formed on the recording layer 2, and an initialization layer 4 formed on the switch layer 3.

The memory layer is a magnetic layer which is magnetized according to a recording signal and consists of at least first magnetic layer 1a in which a residual magnetization Mr is smaller than a saturation magnetization Ms, and a second magnetic layer 1b which has a ratio Mr/Ms between a residual magnetization Mr and a saturation magnetization Ms greater than that of the first magnetic layer 1a. During a recording, this memory layer 1 is magnetized, and during a reproduction, a magnetization state of this memory layer 1 is detected.

The recording layer 2 is a magnetic layer whose magnetization direction is temporarily change according to a recording signal during a recording and functions to temporarily store a magnetization direction to be recorded during a recording. The switch layer 3 is a magnetic layer which is temporarily demagnetized during a recording and, during a recording, functions to control the magnetic connection state between the recording layer 2 and the initialization layer 4. The initialization layer 4 is a magnetic layer whose magnetization direction is not changed during a recording. That is, the initialization layer 4 has a magnetization direction which has been determined during a production and remains unchanged without being inverted during a recording or reproduction. This initialization layer 4 functions to reset the magnetization directions of the switch layer 3 and the recording layer 2 to their initial states.

Description will now be directed to the principle of recording/reproduction of the magneto-optical disk having the aforementioned magnetic layers. Note that in FIG. 2 through FIG. 6, the magnetization direction of each layer is indicated by the direction of an arrow.

Figure 2A:
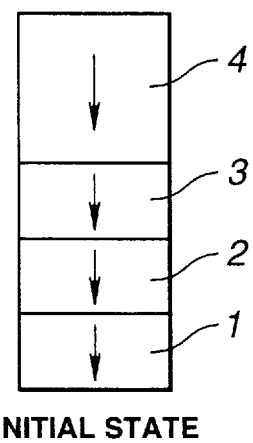
FIGS. 2A 2B and 2C schematically shows the magnetization directions of the magnetic layers: initial state (FIG. 2A), a state when "0" is recorded (FIG. 2B), and a state when "1" is recorded (FIG. 2C).
Figure 2B:
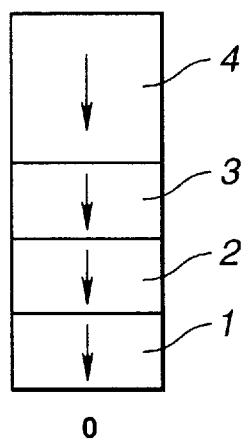
Figure 2C:
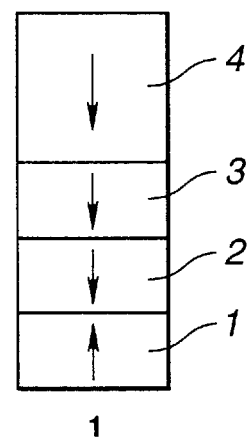

FIG. 2A shows an initial state of the aforementioned magneto-optical disk when the memory layer 1, recording layer 2, the switch layer 3, and the initialization layer 4 have an identical magnetization direction. When "0" of a binarized data signal is recorded, each of the magnetic layers retain its magnetization direction in the initial state, and when "1" is recorded, the magnetization direction of the memory layer 1 is inverted. That is, when "0" is recorded as shown in FIG. 2B, the memory layer 1, the recording layer 2, the switch layer 3, and the initialization layer 4 have an identical magnetization direction, and when "1" is recorded as shown in FIG. 2C, the memory layer 1 alone inverts its magnetization direction. However, it is also possible, depending on the recording format, to invert the state of "0" and the state of "1".

When a data signal is recorded on this magneto-optical disk, recording is carried out by the light intensity modulation method. That is, while a predetermined DC magnetic field is applied to the magneto-optical disk, a laser beam of low level intensity is applied for recording "0" and a laser beam of high level intensity is applied for recording "1" according to a binalized data signal. In this recording, the portion to which the laser beam is applied increases its temperature, but the temperature caused by the low level laser beam is lower than the temperature caused by the high level laser beam.

Description will now be directed to the operation when recording a data signal by applying a low level or a high level laser beam: overwriting "0" on "0" recorded with reference to FIG. 3; overwriting "0" on "1" recorded with reference to FIG. 4; overwriting "1" on "0" recorded with reference to FIG. 5; and overwriting "1" on "1" recorded with reference to FIG. 6.

If a low level laser beam is applied to a state when "0" has been recorded as shown by the magnetization direction of the memory layer 1 in FIG. 3A, the memory layer 1 and the switch layer 3 are demagnetized during a temperature increase as shown in FIG. 3B. At this moment, the recording layer 2 and the initialization layer 4 retain their magnetization unchanged. That is, the low level laser beam is set to an intensity which causes a temperature increase to such an extent that the memory layer 1 and the switch layer 3 are demagnetized.

When the temperature is decreased after this, the memory layer 1 is again magnetized. The magnetization direction of the memory layer 1 in this case is identical to that of the recording layer 2 because of the exchange interaction with the recording layer 2. When the temperature is further decreased, the switch layer 3 is again magnetized. The magnetization direction of the switch layer 3 in this case is identical to that of the initialization layer because of the exchange interaction with the initialization layer 4. As a result of the aforementioned transition, each of the magnetic layers enters a state of "0" recording as shown in FIG. 3D.

On the other hand, if the low level laser is applied when the memory layer 1 has the magnetization direction when a state when "1" has been recorded as shown in FIG. 4A, in the same way as in FIG. 3B, the memory layer 1 and the switch layer 3 are demagnetized during a temperature increase as shown in FIG. 4B. At this moment, the recording layer 2 and the initialization layer 4 retain their magnetization unchanged.

After this, when a temperature is decreased, the memory layer 1 is again magnetized. In this case, as shown in FIG. 4C, the magnetization direction of the memory layer 1 is identical to that of the recording layer 2 because of the exchange interaction with the recording layer 2. After this, when the temperature is further decreased, the switch layer 3 is again magnetized. In this case, the magnetization direction of the switch layer 3 is identical to that of the initialization layer 4 because of the exchange interaction with the initialization layer 4. As a result of the aforementioned transition, each of the magnetic layers enters a state when "0" is recorded as shown in FIG. 4D.

Moreover, if a high level laser beam is applied when the memory layer 1 has a magnetization direction when "0" has bee recorded as shown in FIG. 5A, the memory layer 1 and the switch layer 3 are demagnetized as shown in FIG. 5B and the magnetization direction of the recording layer 2 is inverted by the DC magnetic field applied from outside. That is, the high level laser beam is to be set to an intensity to cause a temperature increase of these layers which demagnetizes the memory layer 1 and the switch layer 3 and sufficiently reduces the coercive force Hc of the recording layer 2.

After this, when the temperature is decreased, the memory layer 1 is again magnetized. In this case, as shown in FIG. 5C, the magnetization direction of the memory layer 1 is identical to that of the recording layer 2 because of the exchange interaction with the recording layer 2. After this, when the temperature is further lowered, the switch layer 3 is again magnetized. In this case, the magnetization direction of the switch layer 3 is identical to that of the initialization layer 4 because of the exchange interaction with the initialization layer 4, and further the magnetization direction of the recording layer 2 becomes identical to that of the switch layer 3 because of the exchange interaction with the switch layer 3. As a result of the aforementioned transition, each of the magnetic layers enters a state that the memory layer 1 alone has an inverted magnetization direction, i.e., a state when "1" is recorded.

On the other hand, if the high level laser beam is applied when the magnetization of the memory layer 1 is in a state when "1" has been recorded as shown in FIG. 6A, the memory layer 1 and the switch layer 3 are demagnetized and the magnetization direction of the recording layer 2 is inverted by the external DC magnetic field as shown in FIG. 6B.

After this, when the temperature is decreased, the memory layer 1 is again magnetized. In this case, as shown in FIG. 6C, the magnetization direction of the memory layer is identical to that of the recording layer 2 because of the exchange interaction with the recording layer 2. After this, when the temperature is further decreased, the switch layer 3 is again magnetized. In this case, the magnetization direction of the switch layer 3 is identical to that of the initialization layer 4 because of the exchange interaction with the initialization layer 4, and further, the magnetization direction of the recording layer 2 becomes identical to that of the switch layer 3 because of the exchange interaction with the switch layer 3. As a result of the aforementioned transition, each of the magnetic layers enters the state as shown in FIG. 6D in which the memory layer 1 alone is inverted, i.e., "1" has been recorded.

As has thus far been described, in the aforementioned magneto-optical disk, it is possible to change the magnetization direction of the memory layer 1 only by modulating the intensity of the laser beam applied, enabling direct overwriting.

When reproducing a data signal from this magneto-optical disk, a laser beam applied to the magneto-optical disk is such a laser beam that has an intensity lower than the aforementioned low level and does not affect the magnetization state of the magnetic layers. The laser beam reflected is used to detect the magnetization sate of the memory layer 1, from which the data signal which has been recorded as the magnetization direction of the memory layer 1 is reproduced. That is, in this magneto-optical disk, the memory layer 1 alone retains the data signal which has been recorded, whereas the other layers serve to enable light intensity modulation direct overwriting.

It should be noted that the explanation given above is to explain an example of basic operation principle of a magneto-optical disk capable of light intensity modulation direct overwriting including the magnetization directions of the memory layer 1, the recording layer 2, the switch layer 3, and the initialization layer 4. The magnetization directions of these layers and the transition type are not limited to the above example.

That is, the magneto-optical disk produced according to the present invention is provided with the memory layer 1, i.e., a magnetic layer which is magnetized according to a recording signal, the recording layer 2, i.e., a magnetic layer whose magnetization direction is temporarily changed according to a recording signal during a recording, the switch layer 3, i.e., a magnetic layer which is temporarily demagnetized during a recording, and the initialization layer 4, i.e., a magnetic layer whose magnetization direction is not changed during a recording. Details of the magnetization directions of these layers may be different from those mentioned above.

In the magneto-light disk capable of optical intensity modulation direct overwriting according to the aforementioned principle, if each of the memory layer 1, the recording layer 2, the switch layer 3, and the initialization layer 4 consists of a single layer, as disclosed in Japanese Patent Laid-Open Sho 63-268103, the disk can be realized by successively forming four magnetic layers.

However, in the magneto-optical disk produced according to the present invention, the memory layer 1 consists of at least a first magnetic layer 1a in which a residual magnetization Mr is smaller than a saturation magnetization Ms, and a second magnetic layer 1b having a ratio Mr/Ms between a residual magnetization Mr and a saturation magnetization Ms greater than that of the first magnetic layer 1a, resulting in total of at least five layers. When the memory layer 1 has a layered configuration, it is possible to increase the change quantity of the Kerr rotational angle of a beam reflected from the magneto-optical disk. Therefore, the layered configuration of the memory layer 1 has a significant effect to realize practical recording/reproducing characteristics.

Figure 7:
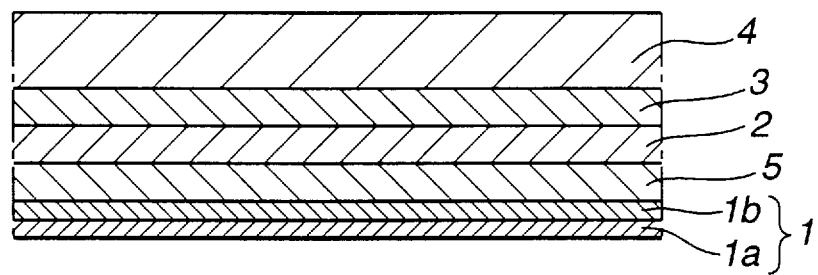
FIG. 7 is a cross-sectional view showing another example of magnetic layers formed on a magneto-optical disk according to the present invention.

Moreover, taking consideration on the operation stability and the margin size during a film formation, as shown in FIG. 7, it is preferable to provide a magnetic layer called an intermediate layer 5 between the memory layer 1 and the recording layer 2 so as to obtain an appropriate exchange interaction between these layers. Consequently, in the magneto-optical disk produced according to the present invention, it is preferable to form a 6-layered configuration consisting of the first magnetic layer 1a and the second magnetic layer 1b composing the memory layer 1, the recording layer 2, the intermediate layer 5, the switch layer 3, and the initialization layer 4. However, presence or absence of the intermediate layer 5 is not essential to the present invention, which can be realized without the intermediate layer 5.

Note that the explanation has been given on the magnetic layers alone to be formed on the disk substrate. However, an actual magneto-optical disk further includes a dielectric layer and a metal layer for improving the optical and thermal characteristics of the magneto-optical disk.

Figure 8:
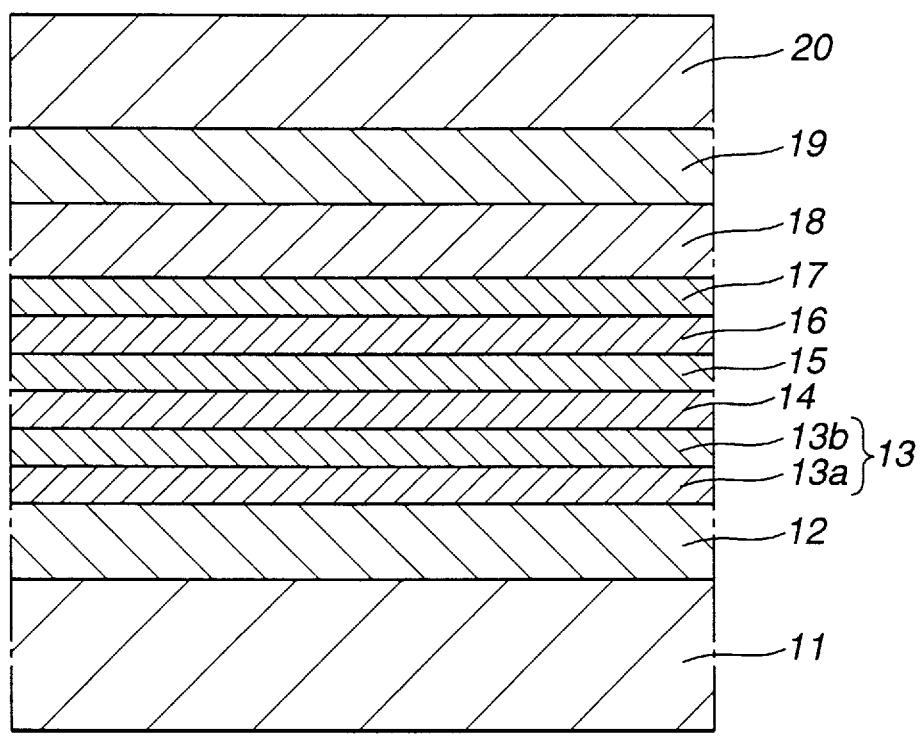
FIG. 8 is a cross-sectional view showing an example the magneto-optical disk produced according to a first embodiment of the present invention.

Description will now be directed to a method according to the present invention for producing a magneto-optical disk having the aforementioned magnetic layers and a configuration as shown in FIG. 8.

When producing this magneto-optical disk according to the present invention, firstly, a dielectric layer 12 is formed on a disk substrate 11. After this, a first magnetic layer 13a composing a memory layer is formed on the dielectric layer 12. Further, a second magnetic layer 13b composing the memory layer 13 is formed on the first magnetic layer 13a.

During this film formation, an external magnetic field is applied in vertical direction to the film surface when the second magnetic layer 13b has become 0.5 nm thickness or above. Thus, the first magnetic layer 13a and the second magnetic layer 13b are polarized in the vertical direction to the film surface.

Subsequently, on the memory layer 13 consisting of the first magnetic layer 13a and the second magnetic layer 13b, there are successively formed an intermediate layer 14, a recording layer 15, a switch layer 16, and an initialization layer 17. Because the memory layer 13 consisting of the first magnetic layer 13a and the second magnetic layer 13b has been polarized, the intermediate layer 14, the recording layer 15, the switch layer 16, and the initialization layer 17 are successively connected by exchange interaction. Consequently, the magnetization directions in the magnetic layers are not in disorder but oriented in a particular direction.

After this, the initialization layer 17 is covered successively by a dielectric layer 18 and a metal layer 19 for the purpose of improving optical and thermal characteristics of the magneto-optical disk, and further covered by a protection layer 20 made from a resin material, thus completing a magneto-optical disk.

The magnetic layers to be formed on the disk substrate 11 are preferably formed continuously without breaking the vacuum state. Moreover, it is preferable to employ the DC magnetron sputter for film formation of rare earth—transition metal amorphous.

In the concrete examples which will be detailed later, the magnetic layers to be formed on the disk substrate 11 were successively formed by the DC magnetron sputtering Ar as the sputter gas without breaking the vacuum state. Adjustment of the compositions of the respective magnetic layers were controlled by setting four targets of Tb, Gd, Fe and $Fe_{20}Co_{80}$ in a single film formation chamber and controlling the power to be applied to these targets. Moreover, in order to suppress irregularities in the film thickness and the compositions of the respective layers, the disk substrate 11 was set on a substrate holder which is attached on a metal plate called a pallet, which is rotated around the center of the pallet while rotating the disk substrate 11 around the center of the substrate holder.

In the aforementioned magneto-optical disk, the first magnetic layer 13a and the second magnetic layer 13b composing the memory layer 13 should satisfy the following conditions.

Figure 9:
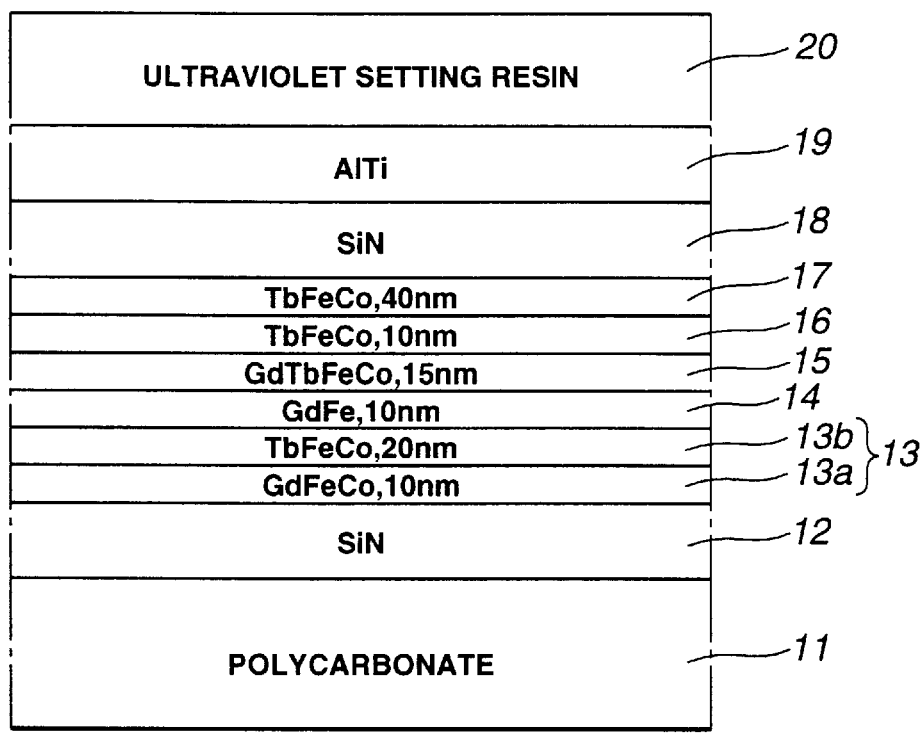
FIG. 9 is a cross-sectional view showing an example the magneto-optical disk produced according to the first embodiment of the present invention with a specific composition.

Firstly, in order to determine the conditions to satisfied by the first magnetic layer 13a and the second magnetic layer 13b composing the memory layer 13, the inventor of the present invention prepared a magneto-optical disk having a configuration as shown in FIG. 9. This magneto-optical disk consists of the disk substrate 11 made from polycarbonate which is successively covered by films of the dielectric layer 12 made from SiN, the memory layer 13, the intermediate layer 14 made from GdFe having a 10 nm thickness, the recording layer 15 made from GdTbFeCo having a 15 nm thickness, the switch layer 16 made from TbFeCo having a 10 nm thickness, the initialization layer 17 made from TbFeCo having a 40 nm thickness, the dielectric layer 18 made from SiN, the metal layer 19 made from AlTi, and the protection layer 20 made from an ultraviolet setting resin. The memory layer 13 consists of the first magnetic layer 13a made from GdFeCo (Co/FeCo=0.1) having a 10 nm thickness and the second magnetic layer 13b made from TbFeCo having a 20 nm thickness.

In this case, the first magnetic layer 13a composing the memory layer 13 has a saturation magnetization Ms of about 150 emu/cc and a coercive force Hc of about 0 Oe; the second magnetic layer 13b composing the memory layer 13 has a saturation magnetization Ms of about 50 emu/cc and a coercive force Hc of about 25 kOe or above; the intermediate layer has a saturation magnetization Ms of about 230 emu/cc; the recording layer 15 has a saturation magnetization Ms of about 60 emu/cc; the switch layer 16 has a saturation magnetization Ms of about 90 emu/cc; and the initialization layer has a saturation magnetization Ms of about 70 emu/cc and a coercive force Hc of about 25 kOe.

Figure 10:
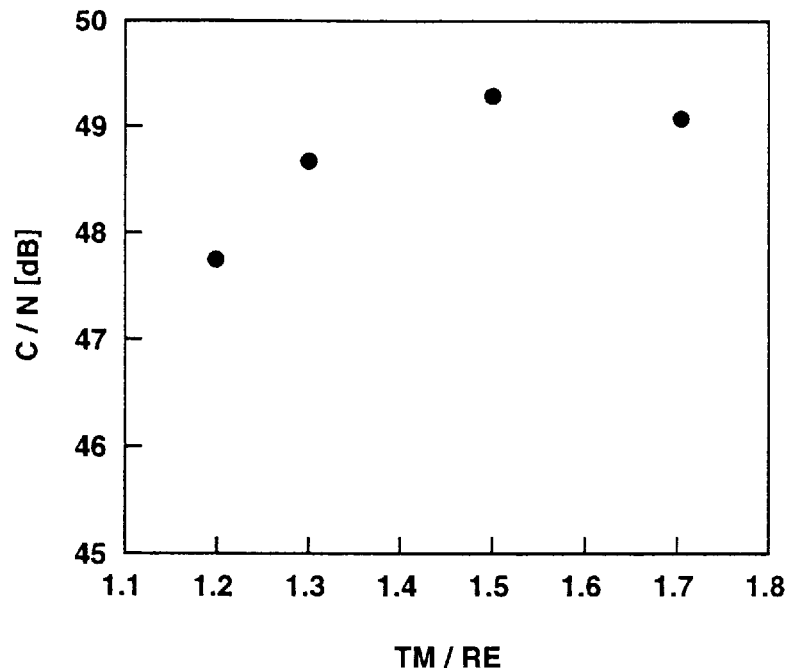
FIG. 10 shows the relationship between the TM/RE of the first magnetic layer and the C/N during a recording/reproduction.

In this magneto-optical disk, the composition of the first magnetic layer 13a composing the memory layer 13 was changed to check the change of the recording/reproduction characteristics. More specifically, in the first magnetic layer 13a made from GdFeCo (Co/FeCo=0.1), the ratio TM/RE between the film formation quantity of the transition metal element and the film formation quantity of the rare earth element was changed so as to determine how the C/N changes during recording/reproduction. The ratio TM/RE between the film formation quantity of the transition metal element and the film formation quantity of the rare earth was calculated from the film formation rate. The recording/reproduction was carried out with a DC magnetic field Hrec of 200 Oe applied to the magneto-optical disk and a recording mark length set to 0.64 μm. The results are shown in FIG. 10.

Normally, it is required in the magneto-optical disk that the C/N be 48 dB or above. As can be understood from FIG. 10, in order to obtain a C/N of 48 dB or above, the ratio TM/RE between the film formation quantity of the transition metal element and the film formation quantity of the rare earth element should be 1.3 or above. FIG. 10 also shows that the C/N is saturated when the ration TM/RE between the film formation quantity of the transition metal element and the film formation quantity of the rare earth element becomes 1.5 or above. Consequently, in order to obtain an optimal recording/reproduction characteristic, the first magnetic layer 13a composing the memory layer 13 should realize 1.5 or above of the ratio TM/RE between the film formation quantity of the transition metal element and the film formation quantity of the rare earth element.

Figure 11:
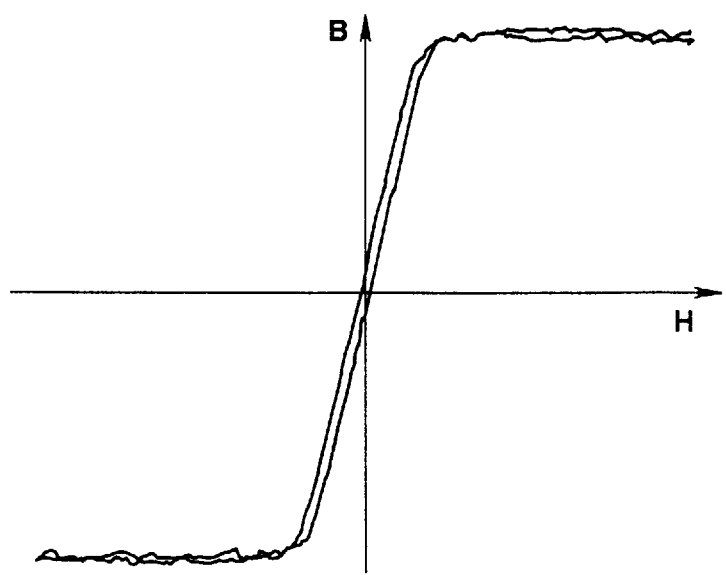
FIG. 11 shows a typical B-H loop when 1.5 is set as the ratio TM/RE between the film formation quantity of the transition metal element and the film formation quantity of the rare earth element.

FIG. 11 shows a typical B-H loop when the ratio TM/RE between the film formation quantity of the transition metal element and the film formation quantity of the rare earth element is set to 1.5 or above. As shown in FIG. 11, when the ratio TM/RE between the film formation quantity of the transition metal element and the film formation quantity of the rare earth element is set to 1.5 or above, the magnetization without any external magnetic field present, i.e., the residual magnetization Mr becomes almost zero. That is, when the ratio TM/RE between the film formation quantity of the transition metal element and the film formation quantity of the rare earth element is set to 1.5 or above, the magnetization of the first magnetic layer 13a made from GdFeCo cannot be oriented in the vertical direction with respect to the film surface and almost oriented inwardly.

For this, if an external magnetic field is applied in the vertical direction to the film surface of the first magnetic layer 13a made from GdFeCo, the magnetization can be oriented in the vertical direction while the magnetic field is applied, but is oriented inwardly if the external magnetic field is removed. Consequently, with the first magnetic layer 13a made from GdFeCo alone, it is impossible to polarize in the vertical direction to the film surface.

In order to solve this problem, according to the present invention, the second magnetic layer 13b is formed on the first magnetic layer 13a. That is, according to the present invention, by forming the second magnetic layer 13b on the first magnetic layer 13a, it is possible to increase the inversion magnetic field, thus enabling to polarize the memory layer 13 consisting of the first magnetic layer 13a and the second magnetic layer 13b.

Figure 12:
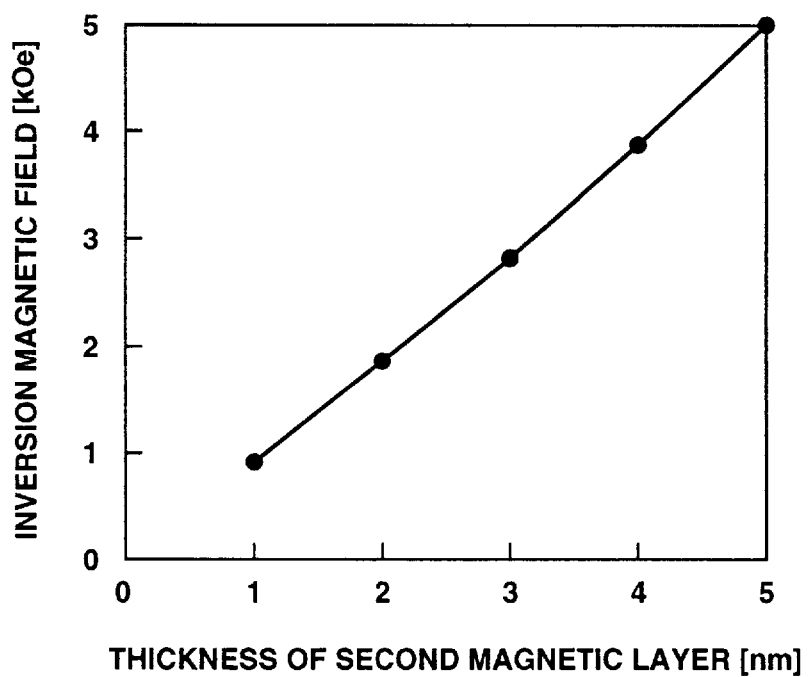
FIG. 12 shows the relationship between the film thickness of the second magnetic layer and the inversion magnetic field of the memory layer.

FIG. 12 shows the inversion magnetic field when the second magnetic layer 13b is formed on the first magnetic layer 13a using the film thickness of the second magnetic layer 13b as a parameter. Note that the composition of the second magnetic layer 13b is preferably in the vicinity of the compensation composition from the viewpoint of the recording characteristic, and preferably RE-rich when considering the magnetic transfer characteristic between the first magnetic layer 13a and the second magnetic layer 13b. Therefore, a calculation was made assuming that the second magnetic layer 13b is made from TbFeCo which is in the vicinity of the compensation composition and RE-rich. In this case, the second magnetic layer 13b has a saturation magnetization Ms of about 50 emu/cc and a coercive force Hc of about 25 kOe. As for the first magnetic layer 13a, a calculation was carried out assuming that it is made from GdFeCo which is TM-rich and having a 10 nm thickness. In this case, the first magnetic layer 13a has a saturation magnetization Ms of about 150 emu/cc and a coercive force Hc of about 0 Oe. The calculation of the inversion magnetic field was made assuming the interface magnetic wall energy $\sigma$ to be 4 erg/cm$^2$.

As can be seen from FIG. 12, by forming the second magnetic layer 13b, the inversion magnetic field is increased and it becomes possible to polarize in the vertical direction to the film surface. The inversion magnetic field is increased as the thickness of the second magnetic layer 13b is increased.

On the other hand, in a film formation which is normally carried out, in order to obtain a uniform thin film over the entire film surface, the minimum thickness of 0.5 to 1 nm is required. As can be seen from FIG. 12, when the second magnetic layer 13b has a thickness in the order of 0.5 to 1 nm, the inversion magnetic field is 500 to 1000 Oe. Consequently, when the second magnetic layer 13b has a thickness in the order of 0.5 to 1 nm, the memory layer 13 consisting of the first magnetic layer 13a and the second magnetic layer 13b is polarized in the vertical direction to the film surface by applying an external magnetic field in the order of 500 to 1000 Oe in the vertical direction to the film surface.

That is, when forming the second magnetic layer 13b on the first magnetic layer 13a, an external magnetic field in the order of 500 Oe is applied in the vertical direction to the film surface at the moment when 0.5 nm thickness or above of the second magnetic layer 13b has been formed, so that it is possible to polarize the memory layer 13 consisting of the first magnetic layer 13a and the second magnetic layer 13b in the vertical direction to the film surface.

When a reference layer having an entire surface polarized is formed, in a magnetic layer formed on this layer, the sub-lattice of the transition metal is magnetized by exchange interaction in the identical direction as the reference layer. Thus, regardless of the number of the magnetic layers formed on the reference layer, all the layers are polarized. That is, the initialization layer 17 which has been difficult to be polarized can easily be polarized in the vertical direction to the film surface only by forming the layer on a preceding layer.

The inventor carried out a test to confirm that the memory layer 13 consisting of the first magnetic layer 13a and the second magnetic layer 13b can be polarized by applying a magnetic field when forming the second magnetic layer 13b. The test will be detailed below. The magneto-optical disk produced as the test example has the similar configuration as the magneto-optical disk shown in FIG. 9.

Test Example 1

In Test Example 1, at the stage when the second magnetic layer 13b has been formed, formation of magnetic layers is interrupted for applying a magnetic field. More specifically, firstly, the dielectric layer 12 and the first magnetic layer 13b were formed on the disk substrate 11 and subsequently the second magnetic layer 13b was formed so as to have a thickness of 5 nm, when the film formation was temporarily terminated and a SiN film was formed to be 10 nm thick as a protection film. The disk was removed from the sputter apparatus and a magnetic field of about 10 kOe was applied in the vertical direction to the film surface over the entire surface of the disk.

When applying such a magnetic field, thickness of the second magnetic layer 13b is sufficient if in the order of 0.5 to 1 nm. However, in this test example, the second magnetic layer 13b was prepared to have a thickness slightly greater than this because, as will be explained later, a portion which may have been damaged is to be removed by the sputter etching when forming the SiN protection film.

After this, the disk was again set in the sputter apparatus, the sputter etching was carried out to remove the SiN protection film and a surface portion of the second magnetic layer 13b which may have bee damaged during film formation of the SiN protection film, and then the remaining magnetic layers were formed. That is, the second magnetic layer 13b was formed so as to have a total thickness of 10 nm including the portion which had been formed previously. This second magnetic layer 13b was then covered successively with the intermediate layer 14, the recording layer 15, the switch layer 16, and the initialization layer 17 without breaking the vacuum state. After this, the dielectric layer 18 and the metal layer 19 were further formed. Then, the disk was taken out from the sputter apparatus and the layers were covered with the protection layer 20 made from a ultraviolet setting resin.

Test Example 2

In Test Example 2, at the stage when the first magnetic layer 13a has been formed, formation of magnetic layers is interrupted for applying a magnetic field. More specifically, firstly, the dielectric layer 12 and the first magnetic layer 13a of 12 nm thickness were formed on the disk substrate 11. At this stage the magnetic layer formation was temporarily terminated and a SiN film was formed to be 10 nm thick as a protection film. The disk was removed from the sputter apparatus and a magnetic field of about 10 kOe was applied in the vertical direction to the film surface over the entire surface of the disk.

In this test example, the first magnetic layer 13a was prepared to have a thickness slightly greater than necessary because, as will be explained later, a portion which may have been damaged is to be removed by the sputter etching when forming the SiN protection film.

After this, the disk was again set in the sputter apparatus, the sputter etching was carried out to remove the SiN protection film and a surface portion of the first magnetic layer 13a which may have bee damaged when the SiN protection film was formed, and then the remaining magnetic layers were formed. That is, the first magnetic layer 13a was successively covered with the second magnetic layer 13b, the intermediate layer 14, the recording layer 15, the switch layer 16, and the initialization layer 17 without breaking the vacuum state. After this, the dielectric layer 18 and the metal layer 19 were further formed. Then, the disk was taken out from the sputter apparatus and the layers were covered with the protection layer 20 made from a ultraviolet setting resin.

Evaluation of Test Example 1 and Test Example 2

For the magneto-optical disks thus prepared, evaluation was made on the error rate during the light intensity modulation direct overwriting. Here, the evaluation was made by using a certification drive with a laser beam wavelength of 680 nm and numerical aperture NA of 0.55 to record (1, 7) RLL random signal at the optimal power and after this, the random signal was overwritten with the same power, so as to determine the error rate.

As a result, the magneto-optical disk of Test Example 1 showed an error rate in the order of $3 \times 10^{-6}$, whereas the magneto-optical disk of Test Example 2 showed an error rate in the order of $1 \times 10^{-3}$. This shows that the error rate is significantly improved by temporarily interrupting the magnetic layer formation for applying a magnetic field when the second magnetic layer 13b has been formed.

The reason for the inferior error rate of the Test Example 2 was found out that there exists not only the signal which has been recorded but also a plenty of signals having no relation with the data pattern and remaining without being erased, which deteriorates the error rate of the magneto-optical disk of Test Example 2. To cope with this, the magneto-optical disk of Test Example 2 was polarized with a bulk erase and its error rate was again checked to find that the same results as Test Example 1 can be obtained. The bulk eraser is an apparatus which applies a laser beam to the magneto-optical disk so as to increase its temperature above the Curie temperature of the initialization layer 17, and simultaneously with this, applies an external magnetic field in the order of 1 kOe so as to polarize the initialization layer 17. From the aforementioned, it is clear that the inferior error rate of the magneto-optical disk of Test Example 2 was caused by the fact that the initialization layer 17 had not been polarized and the erase operation did not function normally.

These tests show that the external magnetic field should be applied not in the stage that the first magnetic layer 13a alone is formed but in the stage when the second magnetic layer 13b is half formed.

Description will now be directed to specific examples of the present invention with comparison to comparative examples, and the evaluation results will be explained. Note that the evaluations given below were made by using the aforementioned certification drive with the laser beam wavelength of 680 nm and the numerical aperture NA of 0.55 to record the (1, 7) random signal at the optimal power and after this, to overwrite the random signal with the same power, so as to determine the error rate. When an inferior error rate was obtained, the recording characteristic and the overwrite characteristic were confirmed by using an evaluation apparatus with the laser beam wavelength of 680 nm and the numerical aperture NA of 0.55.

Embodiment 1

Figure 13:
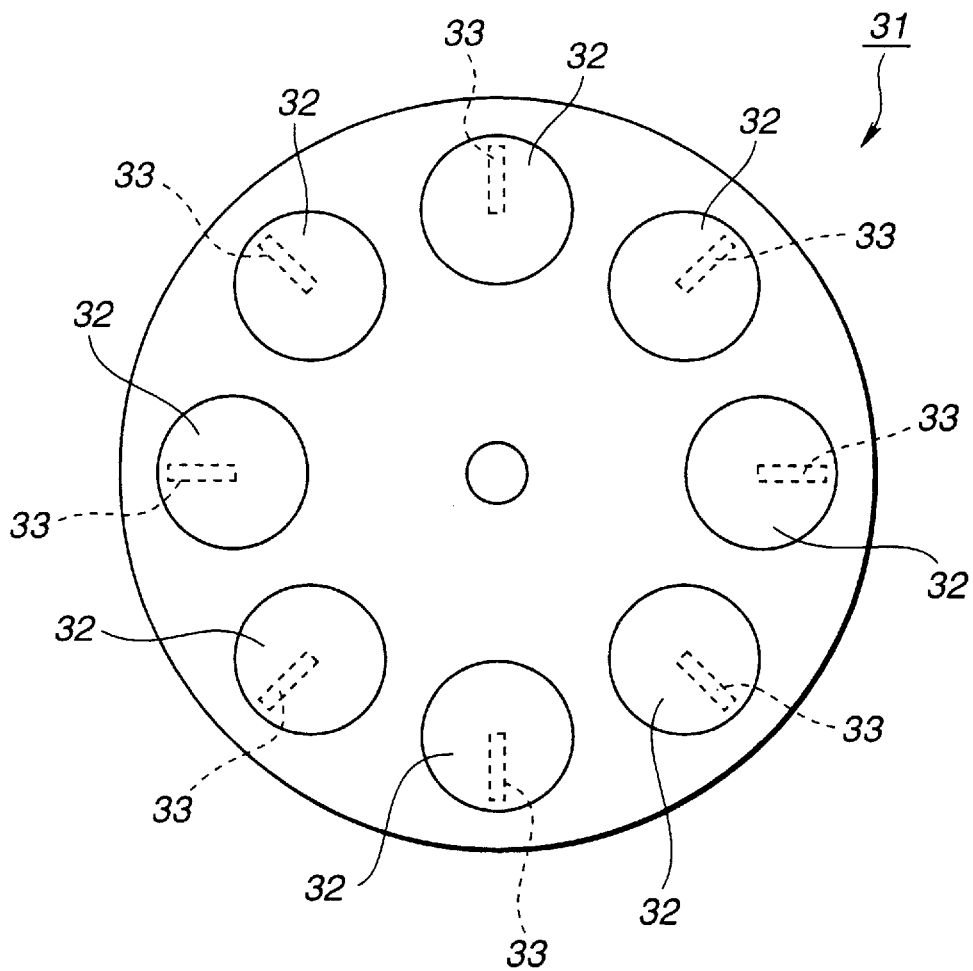
FIG. 13 is a plan view of a pallet used in Embodiments 1 and 2.
Figure 14:
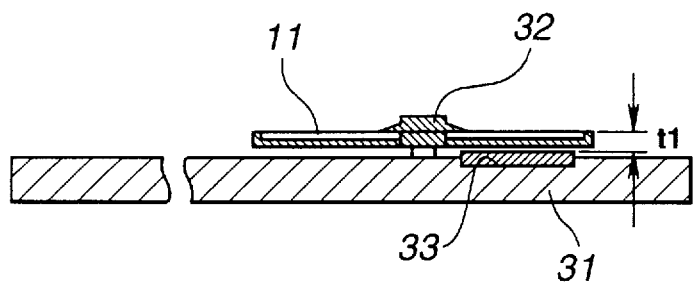
FIG. 14 is a cross-sectional view of an essential portion of the pallet shown in FIG. 13.

According to this embodiment a magneto-optical disk having a configuration as shown in FIG. 9 is produced by using a pallet 31 as shown in FIG. 13 and FIG. 14.

The pallet 31 is a circular metal plate on which a plurality of substrate holders 32 are attached so as to be arranged in the circumferential direction. Each of the substrate holders 32 is for supporting the disk substrate 11 during a film formation and has a size slightly greater than the disk substrate 11. Each of the substrate holders 32 is rotatably mounted on the pallet 31 and rotates around its center, i.e., around the center of the disk substrate 11 so as to rotate the disk substrate 11 around its center.

The pallet 31 is also rotatable and when forming magnetic layers and others on the disk substrate 11, the pallet 31 rotates around its center so as to rotate the disk substrates 11 supported on the substrate holders 32. As shown in FIG. 13 and FIG. 14, the pallet 31 is provided with a plurality of a permanent magnets 33 such as NEOMAX (trade name), each of which is embedded at a position corresponding to the substrate holder 32 so that the distance t1 to the surface of the disk substrate 11 set on the substrate holder 32 is about 10 mm. Each of these permanent magnets 33 applies a magnetic field in the vertical direction to the surface of the disk substrate 11 supported on the substrate holder 32.

Figure 16:
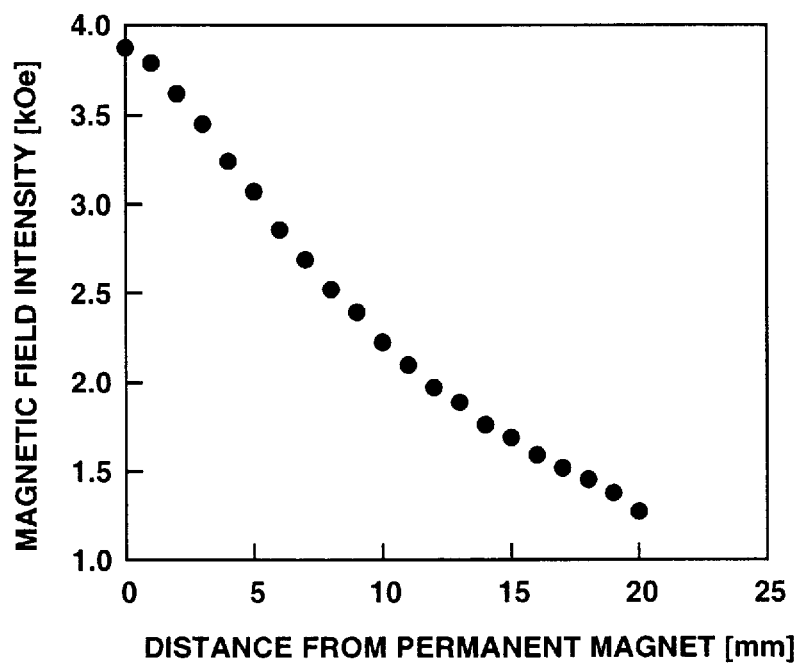
FIG. 16 shows the relationship between the distance from a permanent magnet embedded in the pallet of FIG. 13 and a magnetic intensity obtained by this permanent magnet.

FIG. 16 shows a characteristic of the permanent magnets 33 embedded in the pallet 31. In FIG. 16, the horizontal axis represents the distance from a permanent magnet 33 and the vertical axis represents the magnetic field intensity of the permanent magnet 33. Because the distance t1 between the permanent magnets 33 to the surface of the disk substrates 11 is set to about 10 mm in this embodiment, a magnetic field of about 2 kOe is applied to the surface of the disk substrates 11 set on the substrate holders 32.

In this Embodiment 1, the disk substrate 11 is set on the aforementioned substrate holder 32 and magnetic layer and others are successively formed on the disk substrate 11 while rotating the substrate holder 32 so as to rotate the disk substrate 11 and simultaneously with this, rotating the pallet 31 on which the substrate holder 32 is attached.

That is, in this Embodiment 1, the disk substrate 11 made from polycarbonate is mounted on the aforementioned substrate holder 32 and the aforementioned pallet 31 is set in a sputter apparatus. While rotating the pallet 31 and the substrate holder 32, on the disk substrate 11 are successively formed the dielectric layer 12 of SiN, the first magnetic layer 13a of GeFeCo having a 10 nm thickness, the second magnetic layer 13b of TbFeCo having a 20 nm thickness, the intermediate layer 14 of GdFe having a 10 nm thickness, the recording layer 14 of GdTbFeCo having a 15 nm thickness, the switch layer 16 of TbFeCo having a 10 nm thickness, the initialization layer 17 of TbFeCo having a 40 nm thickness, the dielectric layer 18 of SiN, and the metal layer 19 of AlTi without breaking the vacuum state. During this process, the permanent magnet 33 embedded in the pallet 31 applies a magnetic field in the vertical direction to the film surface of each of the magnetic layers, thus magnetizing the respective magnetic layers in the vertical direction to the film surface. When the aforementioned film formations are complete, the disk substrate 11 is taken out from the sputter apparatus, and a protection layer 20 of a ultraviolet setting resin is formed on the metal layer 19 made from AlTi. Thus, the magneto-optical disk having the configuration shown in FIG. 9 is complete.

In this Embodiment where the permanent magnet 33 applies a magnetic field to the disk substrate 1 set on the substrate holder, there is a possibility that fragments from magnetic layers are attached to the substrate holder 32 by the magnetic field from the permanent magnet 33. If such fragments are attached to the substrate holder 32, they may cause scars on the substrate of the disk substrate 11, resulting in a defective product. Consequently, it is preferable that the substrate holder 32 has some kind of means for preventing attachment of such fragments of magnetic layers.

To solve this problem, in this Embodiment 1, the permanent magnet 33 embedded in the pallet 31 has a rectangular configuration with its longer axis corresponds to the radius of the disk substrate 11. Consequently, the magnetic field from the permanent magnet 33 is not constantly applied to the entire region of the substrate holder 32 on which the disk substrate 11 is set, but the magnetic field covers entire region of the substrate holder 32 when the substrate holder 32 is rotated around its center. Accordingly, in this Embodiment 1, even if the permanent magnet 33 is embedded in the pallet 31, there is no possibility that fragments from the magnetic layers are attached to the substrate holder 32, suppressing generation of defects due to such fragments.

Comparative Example 1

In this Comparative Example 1, a magneto-optical disk was produced in the same way as Embodiment 1 except for that the permanent magnets 33 used in Embodiment 1 were removed from the pallet 31.

Evaluation of Embodiment 1 and Comparative Example 1

The error rate was evaluated for the magneto-optical disk produced in Embodiment 1 and the magneto-optical disk produced in Comparative Example 1. The magneto-optical disk produced in Embodiment 1 showed an error rate of $2 \times 10^{-6}$, whereas the magneto-optical disk produced in Comparative Example showed an error rate of $7 \times 10^{-3}$.

The cause of the inferior error rate of Comparative Example 1 was checked in the same way as the Test Example 2. It was found that in the same way as the Test Example 2, the cause was inferior polarization of the initialization layer 17. From this result, it can be understood that Embodiment 1 which forms magnetic layers while applying a magnetic field from the permanent magnet 33, it is possible to sufficiently polarize the initialization layer 17, resulting a magneto-optical disk having a low error rate.

Comparative Example 2

In this Comparative Example 2, a magneto-optical disk was produced in the same way as in the Embodiment 1 except for that the composition of the first magnetic layer 13a was made identical to the composition of the second magnetic layer 13b. That is, in this Comparative Example, the first magnetic layer 13a is removed from the Embodiment 1 and the thickness of the second magnetic layer 13b was made to be 30 nm.

Evaluation of Comparative Example 2

Evaluation was made on the error rate of the magneto-optical disk produced in Comparative Example 2, and it was determined to be $3 \times 10^{-3}$. The cause of this inferior error rate was checked in the same way as the Test Example 2, and it was found that, in the same way as Test Example 2, the cause was inferior polarization of the initialization layer 17. Judging from this result and the result of Embodiment 1, the presence of the first magnetic layer 13a is an indispensable factor for polarizing the initialization layer 17 which is formed while applying a magnetic field from the permanent magnet 33.

Embodiment 2

Figure 15:
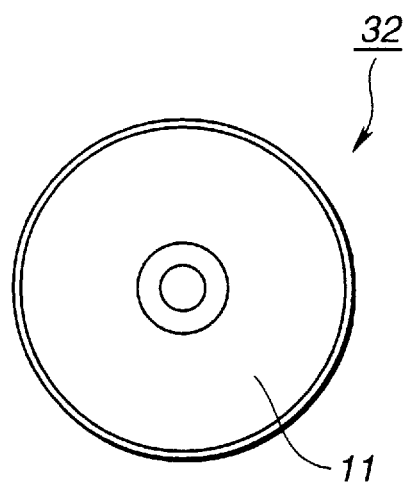
FIG. 15 is a plan view of a substrate holder to be attached to the pallet shown in FIG. 13.
Figure 17:
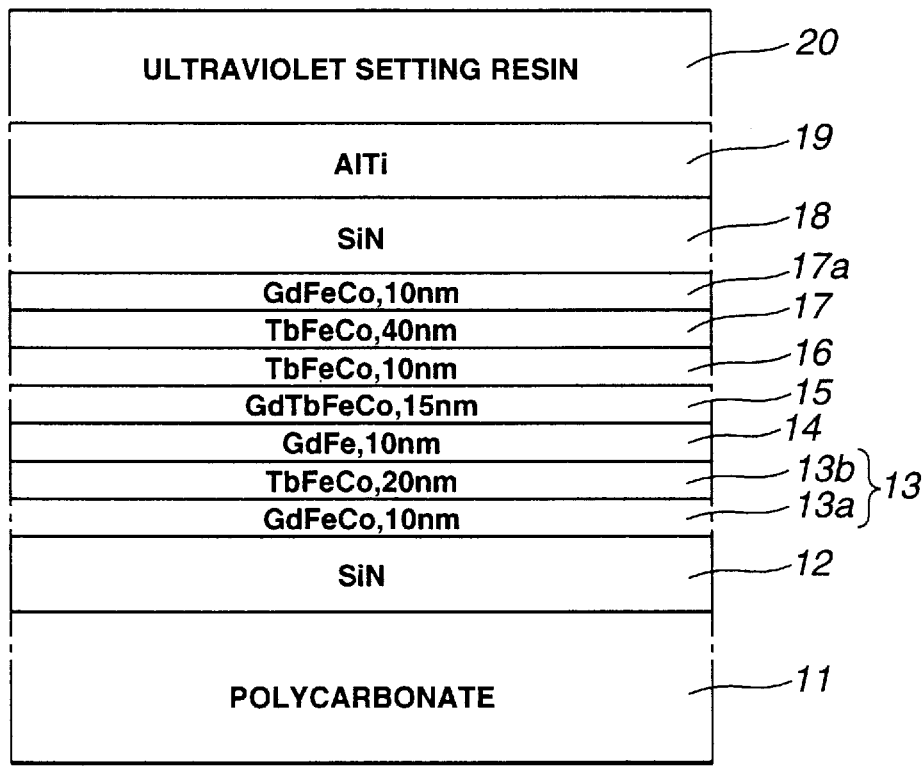
FIG. 17 is a cross-sectional view showing an example the magneto-optical disk produced according to a second embodiment of the present invention with a specific composition.

According to this embodiment a magneto-optical disk having a configuration as shown in FIG. 17 is produced by using the pallet 31 and the substrate holder 32 as shown in FIG. 13 to FIG. 15.

That is, in this Embodiment 1, the disk substrate 11 made from polycarbonate is mounted on the aforementioned substrate holder 32 and the aforementioned pallet 31 is set in a sputter apparatus. While rotating the pallet 31 and the substrate holder 32, on the disk substrate 11 are successively formed the dielectric layer 12 of SiN, the first magnetic layer 13a of GeFeCo having a 10 nm thickness, the second magnetic layer 13b of TbFeCo having a 20 nm thickness, the intermediate layer 14 of GdFe having a 10 nm thickness, the recording layer 14 of GdTbFeCo having a 15 nm thickness, the switch layer 16 of TbFeCo having a 10 nm thickness, the initialization layer 17 of TbFeCo having a 40 nm thickness, an auxiliary polarization layer 17a of GdFeCo having a 10 nm thickness, the dielectric layer 18 of SiN, and the metal layer 19 of AlTi without breaking the vacuum state.

Here, the auxiliary polarization layer 17a serves to reduce the inversion magnetic field of the initialization layer 17. That is, in the Embodiment, the initialization layer 17 is covered with the auxiliary polarization layer 17a made from GdFeCo, which reduces the inversion magnetic field of the initialization layer 17 to the order of 15 kOe.

During the film formation process, in the same way as in Embodiment 1, the permanent magnet 33 embedded in the pallet 31 applies a magnetic field in the vertical direction to the film surface of each of the magnetic layers, thus magnetizing the respective magnetic layers in the vertical direction to the film surface. When the aforementioned film formations are complete, the disk substrate 11 is taken out from the sputter apparatus, and a protection layer 20 of a ultraviolet setting resin is formed on the metal layer 19 made from AlTi. Thus, the magneto-optical disk having the configuration shown in FIG. 17 is complete.

In this Embodiment, the first magnetic layer 13a composing the memory layer 13 has a saturation magnetization Ms of about 150 emu/cc and a coercive force Hc of about 0 Oe; the second magnetic layer 13b composing the memory layer 13 has a saturation magnetization Ms of about 50 emu/cc and a coercive force Hc of about 25 kOe or above; the intermediate layer 14 has a saturation magnetization has a saturation magnetization Ms of about 230 emu/cc; the recording layer 15 has a saturation magnetization Ms of about 60 emu/cc; the switch layer has a saturation magnetization Ms of 90 emu/cc; the initialization layer 17 has a saturation magnetization Ms of about 70 emu/cc and a coercive force Hc of about 25 kOe or above; and the auxiliary polarization layer 18 has a saturation magnetization Ms of about 300 emu/cc and a coercive force Hc of about 0 Oe.

Comparative Example 3

In this Comparative Example 3, a magneto-optical disk was produced in the same way as Embodiment 2 except for that the permanent magnets 33 were removed from the pallet 31 used. After this, an external magnetic field of about 20 kOe was applied for polarization in the vertical direction to the film surface of the magneto-optical disk produced.

Evaluation of Embodiment 2 and Comparative Example 3

Embodiment 2 and Comparative Example 2 reduce the inversion magnetic field of the initialization layer 17 by providing the polarization auxiliary layer 17a, and the initialization layer 17 can be polarized even at a room temperature after film formation. In Embodiment 2, the polarization auxiliary layer 17a is provided so as to reduce the inversion magnetic field of the initialization layer 17, and the magnetic layers are polarized during the film formation. On the other hand, in Comparative Example 3, the polarization auxiliary layer 17a is provided so as to reduce the inversion magnetic field of the initialization layer 17, and polarization of the magnetic layers are carried out after the film formation. Consequently, by comparing Embodiment 2 to Comparative Example 3, it is possible to evaluate a difference between the polarization during the film formation and the polarization after the film formation.

Moreover, the error rate evaluation was carried out for the magneto-optical disk produced in Embodiment 2 and the magneto-optical disk produced in Comparative Example 3. As a result, it was found that the magneto-optical disk produced in Embodiment 2 had an error rate of $2 \times 10^{-6}$; and the magneto-optical disk produced in Comparative Example 3 had an error rate of $7 \times 10^{-5}$.

The cause of the high error rate of Comparative Example 3 was checked and it was found that the operation of the light intensity modulation direct overwriting was normally carried out but the noise level was high and the S/N was low compared to Embodiment 2. The cause of the high noise level was found out in that the groove portion was not erased, which increased the noise level.

In order to solve this problem, a laser beam equivalent to the erase level was applied to the groove portion of the magneto-optical disk produced in Comparative Example 3, so as to erase the groove portion. It should be noted that the laser beam equivalent to the erase level applied to the groove portion has an intensity sufficiently lower than the power causing a magnetic inversion of the initialization layer 17 and does not affect the magnetization of the initialization layer 17. After erasing the groove portion, the error rate was again evaluated and the same result as Embodiment 2 was obtained.

Judging from the aforementioned results, it is clear that polarization after the film formation cannot completely polarize the memory layer 13 consisting of the first magnetic layer 13a and the second magnetic layer 13b, and an erase processing is required for obtaining a preferable error rate. On the other hand, when polarization is carried out during a film formation, it is possible to polarize even the second magnetic layer 13b having an inversion magnetic field of 20 kOe at the room temperature. That is, when polarization is carried out by applying a magnetic field during a film formation, it is possible to completely polarize the memory layer 13 consisting of the first magnetic layer 13a and the second magnetic layer 13b regardless of the land portion or the groove portion, thus enabling to obtain a preferable error rate immediately after the film formation.

Embodiment 3

Figure 18:
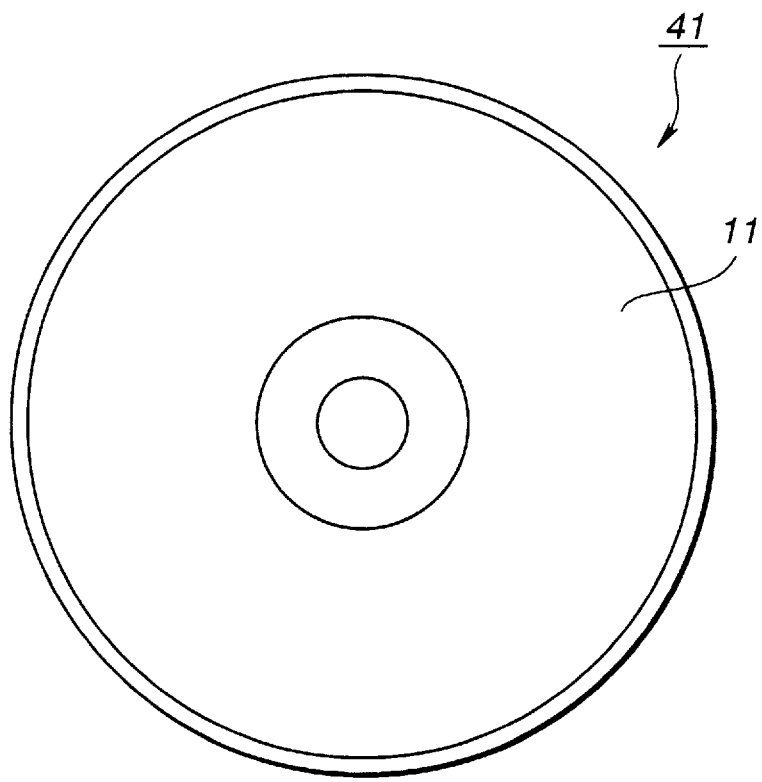
FIG. 18 is a plan view of a substrate holder used on Embodiment 3.
Figure 19:
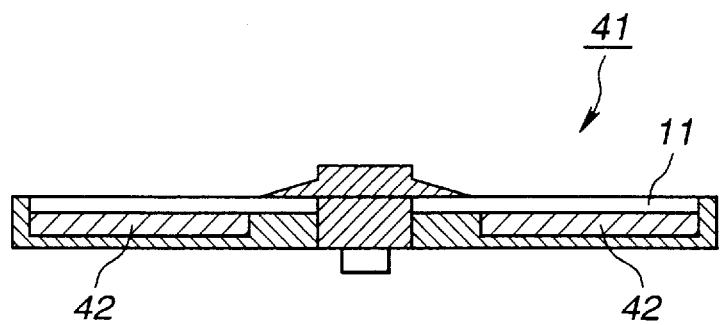
FIG. 19 is a cross-sectional view of the substrate holder shown in FIG. 18.

In this embodiment, a magneto-optical disk was produced in the same way as in Embodiment 1 except for that a substrate holder 41 shown in FIG. 18 and FIG. 19 was attached to the pallet.

The substrate holder 41 is for supporting the disk substrate 11 during a film formation and has a disk shape slightly greater than the disk substrate 11. The substrate holder 41 is rotatably mounted on the pallet. During a magnetic layer formation on the disk substrate 11, the substrate holder 41 rotates around its center so as to rotate the disk substrate 11 around its center.

In this substrate holder 41, a permanent magnet 42 such as NEOLAX (trade name) is embedded at a position corresponding to the entire recording plane of the magneto-optical disk to be produced. With this permanent magnet 42, a magnetic field is applied in the vertical direction to the main plane of the disk substrate 11 set on the substrate holder 41.

As this substrate holder 41 having the permanent magnet 42 embedded, there is a great possibility that fragments from the magnetic layers are attached to the plane on which the disk substrate 11 is mounted. In order to readily remove such fragments, the permanent magnet 42 can be detached from the substrate holder 41, and the permanent magnet 42 is not exposed on the surface where the disk substrate 11 is mounted. Consequently, even if any fragments from the magnetic layers are magnetically attached to the substrate holder 41, the fragments can readily be removed by detaching the permanent magnet 42.

On the other hand, the pallet on which the substrate holder 41 is attached has basically the same configuration as the pallet 31 shown in FIG. 13 and FIG. 14, but in this embodiment the permanent magnet 42 is embedded in the substrate holder 41, no permanent magnet is embedded in the pallet.

Evaluation of Embodiment 3

The error rate was evaluated for the magneto-optical disk according to Embodiment 3, and a result similar to that of Embodiment 1 was obtained. From this result, it is clear that the magnetization layer can be polarized in the same way as Embodiment 1 by providing the permanent magnet 42 in the substrate holder 41 so as to apply a magnetic field over the entire region of the disk substrate 11 during a film formation.

As has thus far been described, according to the present invention, the memory layer which is magnetized according to a recording signal consists of at least the first magnetic layer having the residual magnetization Mr smaller than the saturation magnetization Ms and the second magnetic layer having the ration Mr/Ms between the residual magnetization Mr and the saturation magnetization Ms greater than that of the first magnetic layer; and an external magnetic field is applied in almost in the vertical direction to the film surface when while forming the second magnetic layer on the first magnetic layer. Thus, it is possible to polarize the initialization layer in the vertical direction to the film surface, which layer does not change the magnetization direction during a recording. That is, according to the present invention, it is possible to polarize the initialization layer even if the coercive force Hc of the initialization layer is infinite. Consequently, by employing the present invention, it is possible to eliminate the conventional requirement that the coercive force Hc of the initialization layer at the room temperature be ten and several kOe or below.

Thus, according to the present invention, the requirements of the initialization become less strict, and it becomes possible to use for the initialization layer those materials which could not be used conventionally because of impossibility of polarization at the room temperature such as a material in the vicinity of the compensation composition. This makes it possible to thermally and magnetically stable the initialization layer of the magneto-light recording medium capable of optical intensity modulation direct overwriting.

Moreover, according to the present invention, it is possible to polarize the initialization layer regardless of the coercive force Hc of the initialization layer, it becomes unnecessary to strictly determine the increase and decrease of the coercive force Hc caused by the composition variation of the initialization layer. That is, the present invention increases the margin during a production.

Furthermore, according to the present invention, not only the initialization layer but all the other layers are polarized during a film formation, and it is possible to obtain an optimal error rate immediately after the film formation.

What is claimed is:

1. A method for producing a magneto-optical recording medium comprising the steps of:
   (a) providing a first memory magnetic layer which is magnetized by a recording signal during recording, said first memory magnetic layer comprising a first magnetic layer in which residual magnetization Mr is smaller than saturation magnetization Ms, and a second magnetic layer in which a ratio Mr/Ms between a residual magnetization Mr and a saturation magnetization Ms is greater than that of said first magnetic layer;
   (b) providing over the first memory magnetic layer a second recording magnetic layer whose magnetization direction is only temporarily changed by the recording signal;
   (c) providing over the second recording magnetic layer a third switch magnetic layer which is temporarily demagnetized during recording; and (d) providing over the third switch magnetic layer a fourth initialization and magnetic layer whose magnetization direction is not changed during recording; and
   (e) applying an external magnetic field at least substantially in a vertical direction to said medium at least when providing said second recording magnetic layer on said first memory magnetic layer.

2. The method of claim 1, wherein said second recording magnetic layer is provided in increasing thickness and external magnetic field is applied at a moment when said second recording magnetic layer has reached 0.5 nm thickness or above.

* * * * *